United States Patent
Subramanian et al.

(10) Patent No.: US 7,490,519 B2
(45) Date of Patent: Feb. 17, 2009

(54) SYSTEM AND METHOD FOR SENSING DIFFERENTIAL PRESSURE

(75) Inventors: Kanakasabapathi Subramanian, Clifton Park, NY (US); Kuna Venkat Satya Rama Kishore, Bangalore (IN); Parag Thakre, Nagpur (IN); Russell William Craddock, Nuneaton (GB); Peter Ken Kinnell, Leicestershire (GB); John Christopher Greenwood, Leicestershire (GB)

(73) Assignee: General Electric Company, Niskayuna, NY (US)

( * ) Notice: Subject to any disclaimer, the term of this patent is extended or adjusted under 35 U.S.C. 154(b) by 478 days.

(21) Appl. No.: 11/241,049

(22) Filed: Sep. 30, 2005

(65) Prior Publication Data

US 2007/0074578 A1    Apr. 5, 2007

(51) Int. Cl.
*G01L 13/02* (2006.01)
*G01L 15/00* (2006.01)

(52) U.S. Cl. .......................... 73/716; 73/702
(58) Field of Classification Search ........... 73/700–756; 361/283.1–283.4
See application file for complete search history.

(56) References Cited

U.S. PATENT DOCUMENTS

| 4,173,149 | A |   | 11/1979 | Critten et al. ............... 73/706 |
|---|---|---|---|---|
| 4,930,043 | A | * | 5/1990 | Wiegand .................. 73/514.18 |
| 5,165,289 | A |   | 11/1992 | Tilmans |
| 5,317,917 | A |   | 6/1994 | Dufour |
| 5,551,299 | A |   | 9/1996 | Tamai et al. .................. 73/706 |
| 5,796,007 | A |   | 8/1998 | Panagotupulos et al. ...... 73/716 |
| 5,844,141 | A | * | 12/1998 | Stansfeld ..................... 73/702 |
| 6,021,675 | A | * | 2/2000 | Seefeldt et al. ............... 73/777 |
| 6,640,640 | B2 |   | 11/2003 | Scholz et al. .................. 73/716 |
| 2002/0108447 | A1 |   | 8/2002 | Burczyk et al. ............... 73/716 |
| 2004/0168519 | A1 |   | 9/2004 | Kalvensten et al. |

FOREIGN PATENT DOCUMENTS

| CN | 1485600 | 3/2004 |
|---|---|---|
| EP | 0776468 | 10/2002 |
| GB | 2 229 816 | 10/1990 |

OTHER PUBLICATIONS

H.B.Land,III and C.L.Eddins "Optical Pressure Measurement", IEEE Instrumentation & Measurement Magazine, Sep. 2004, PP (38-45).
Satoshi Kato et al., "High-Precision Silicon Differential Pressure Sensor Monolithically Integrated With Twin Diaphragms And Micro Over-Range Protection Structures", IEEE 2000 PP (347-351).
Carlos H. Mastrangelo et al., "Surface-Micromachined Capacitive Differential Pressure Sensor with Lithographically Defined Silicon Diaphragm", IEEE 1996, PP (98-105).

(Continued)

*Primary Examiner*—Andre J Allen
*Assistant Examiner*—Jermaine Jenkins
(74) *Attorney, Agent, or Firm*—Patrick K. Patnode

(57) ABSTRACT

A differential pressure sensing system is provided. The sensing system includes a membrane layer having a channel extending diametrically therein, and including one or more cavities provided radially outbound of the channel and at least one resonant beam disposed in the channel and configured to oscillate at a desired frequency. The system further includes sensing circuitry configured to detect oscillation of the at least one resonant beam indicative of deformation in the membrane layer.

9 Claims, 4 Drawing Sheets

OTHER PUBLICATIONS

H.A.C. Tilmans and S. Bouwstra "A novel design of a highly sensitive low differential-pressure sensor using built-in resonant strain gauges", IOP Publishing Ltd 1993, PP (198-202).

Erik Stemme and Goran Stemme "A Balanced Dual-Diaphragm Resonant Pressure Sensor in Silicon", IEEE Transactions on Electron Devices, vol. 37. No. 3. Mar. 1990. PP (648-653).

* cited by examiner

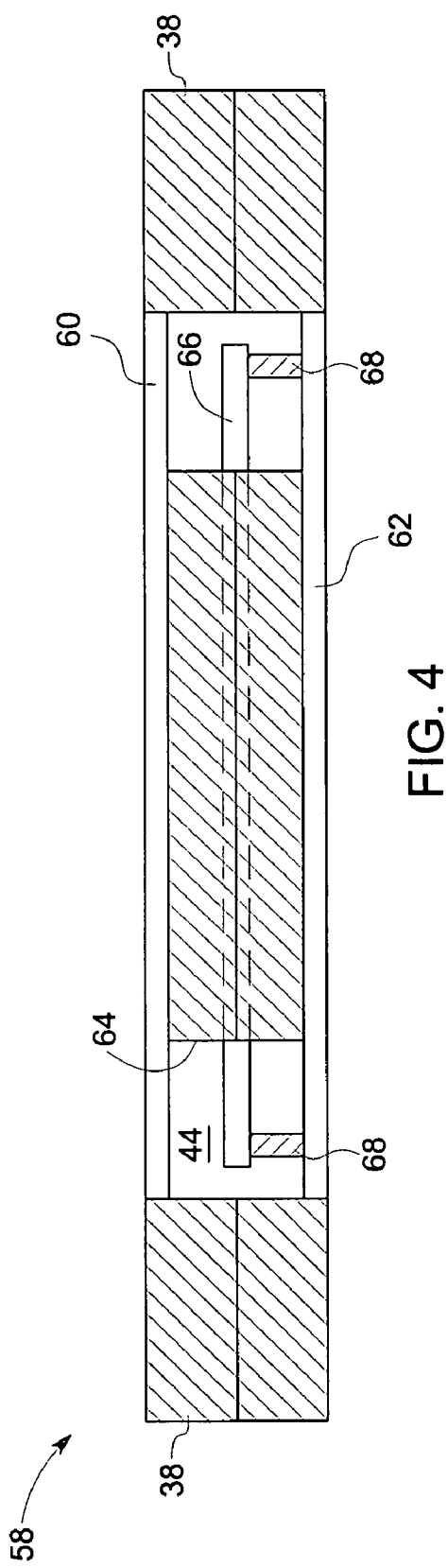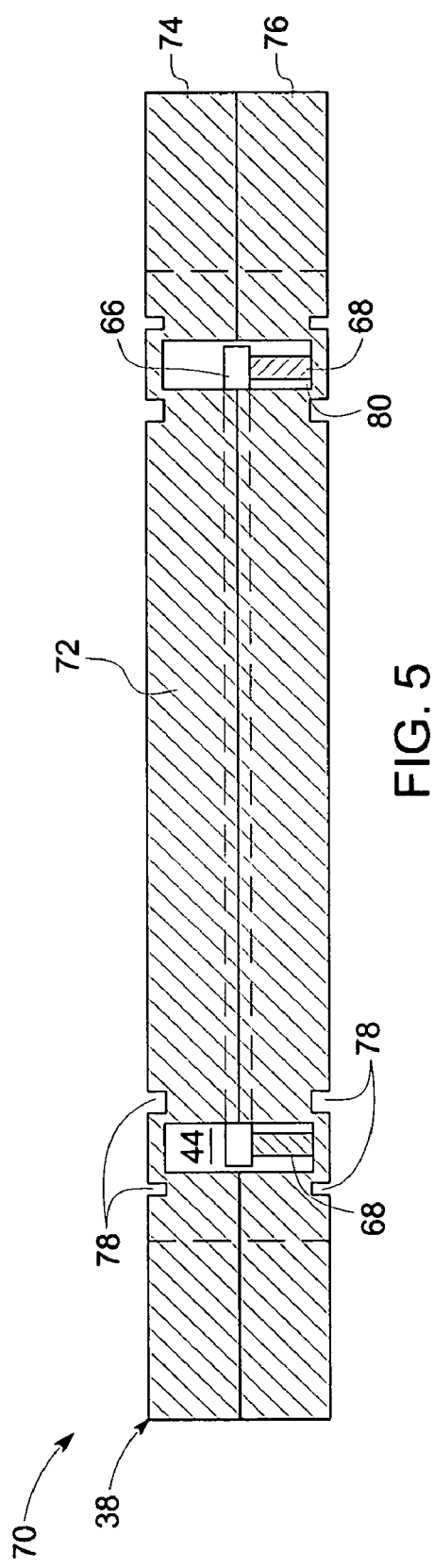

SYSTEM AND METHOD FOR SENSING DIFFERENTIAL PRESSURE

BACKGROUND

The present invention relates generally to sensors and, more particularly, to resonant differential pressure sensors.

Traditional differential pressure sensors are designed to determine the differential pressure between the two sides of the sensor. By way of example, traditional differential pressure sensors detect the differential pressure between two regions of interest by evaluating the net effect of the pressure forces of the two regions on a component or components of the sensor. When employed in harsh industrial environments, traditional pressure sensors often require a more robust construction. For example, if a differential pressure sensor is exposed to relatively high-pressure and/or high-temperature environments, the exposed components of the pressure sensor benefit from a construction robust enough to accommodate these conditions.

However, such traditional differential pressure sensors, the features and attributes that facilitate operation in such high pressure (i.e., harsh) environments can negatively impact the resolution of the sensor. That is to say, traditional differential pressure sensors that are robust enough to withstand high-pressure environments, for example, cannot detect the pressure differential between the two regions of interest in orders of magnitude less than the pressure difference in the environment. For example, resonating differential pressure sensors robust enough to withstand pressures of 5000 pounds per square. inch (psi), and beyond, generally do not have sufficient resolutional capabilities to detect a pressure differential of +/−10 psi, for instance. This is because traditional resonating pressure sensors contain vacuum within the closed enclosure between the diaphragms of the pressure sensor, and therefore with high pressures acting on the each of the diaphragm, the diaphragms may tend to bulge inside.

Thus, there is a need for a pressure sensing system and method that can provide differential pressure sensing capabilities with high resolution, while withstanding high line-pressures, for instance.

SUMMARY

In accordance with one aspect of the present technique, a differential pressure sensing system is provided. The system comprises a membrane layer having a channel extending diametrically therein, and including one or more cavities provided radially outbound of the channel and at least one resonant beam disposed in the channel and configured to oscillate at a desired frequency. The system further includes sensing circuitry configured to detect oscillation of the at least one resonant beam indicative of deformation in the membrane layer.

In another embodiment of the present technique a differential pressure sensor is provided that comprises a fixed support structure and a first membrane layer and a second membrane layer coupled to the fixed support structure. The first and second membrane layers cooperate to define at least one cavity therein. The sensor further includes a resonant member disposed within the cavity and configured to oscillate at a resonant frequency and one or more mesas bonded on the first and the second membrane layers and coupled to the resonant member. The mesas are configured to transmit deformations generated in the first membrane layer to the second membrane layer and to the at least one resonant member.

In alternate embodiment of the present technique, a method of manufacturing a differential pressure sensor is provided. The method comprises disposing a first membrane layer including a first channel in a fixed support structure and disposing a second membrane layer including a second channel in the fixed support structure, such that the first and second membranes form a membrane and the first and second channels form a closed channel. The closed channel extends to peripheral portions of the membrane. The method further comprises disposing at least one resonant beam slidably within the closed channel and one or more cavities etched within the peripheral portions of the membrane. The one or more pillars support the at least one resonant beam within the one or more cavities at the peripheral portions of the membrane.

These and other advantages and features will be more readily understood from the following detailed description of preferred embodiments of the invention that is provided in connection with the accompanying drawings.

BRIEF DESCRIPTION OF THE DRAWINGS

FIG. 4 is a cross-sectional view of a differential pressure sensor, in accordance with an exemplary embodiment of the present technique;

FIG. 5 is a cross-sectional view of a differential pressure sensor, in accordance with an embodiment of the present technique.

DETAILED DESCRIPTION OF EXEMPLARY EMBODIMENTS

In the subsequent paragraphs, an approach for measuring pressure differential within an industrial system will be explained in detail. The approach described hereinafter provides and facilitates measurements of high-resolution differential pressure in high line-pressure environments. As will be appreciated by those of ordinary skill in the art, and as a preliminary matter, line-pressure is the pressure force independently acting on a diaphragm, while the difference between the line-pressures acting on the two surfaces of a diaphragm (in a single diaphragm differential pressure sensor) or on the two diaphragms (of a two-diaphragm differential pressure sensor) is called differential pressure. The various aspects of the present technique will be explained, by way of example only, with the aid of figures hereinafter.

Figure 1:
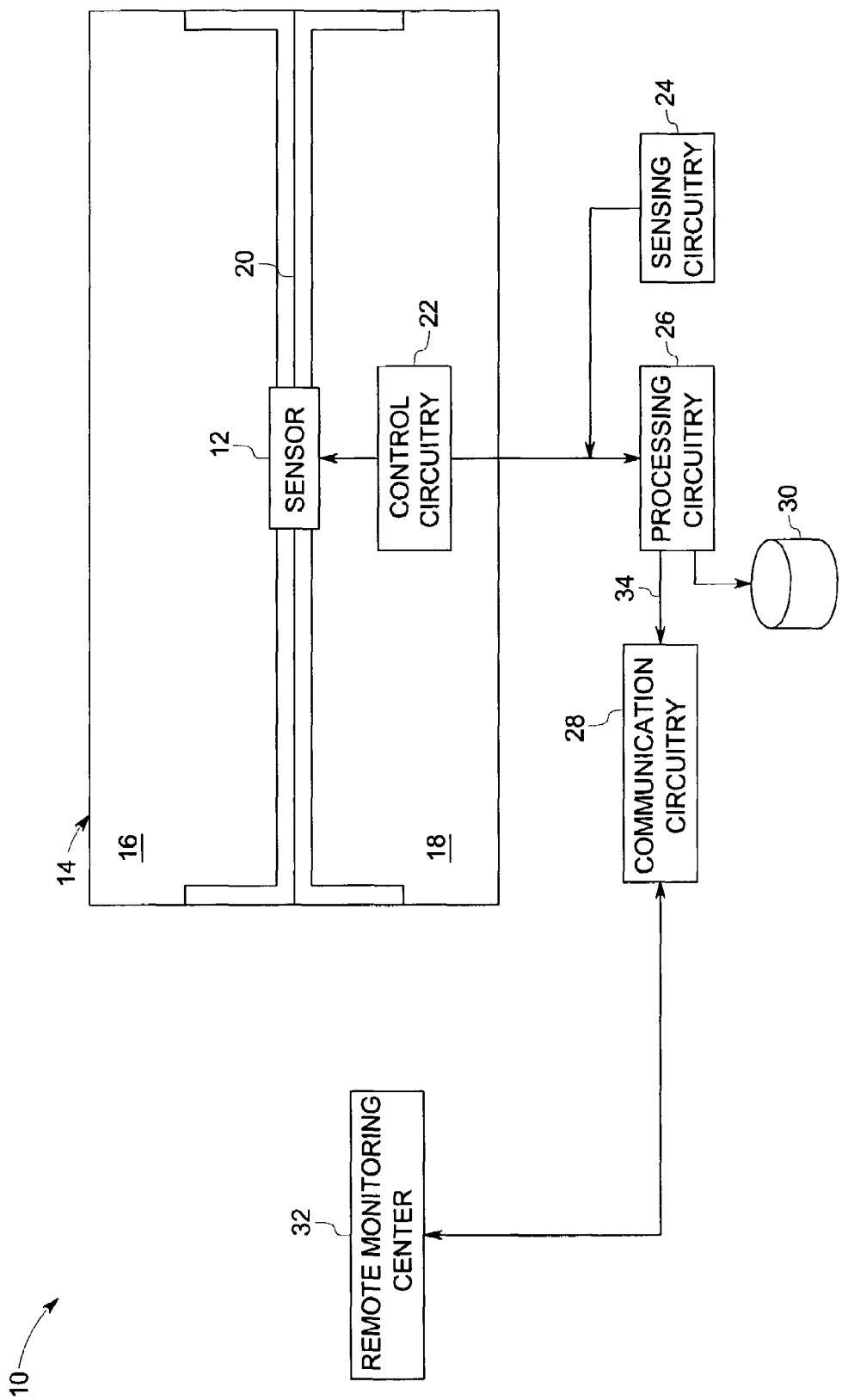
FIG. 1 is a diagrammatical view of a differential pressure sensing system, in accordance with an exemplary embodiment of the present technique.

Referring generally to FIG. 1, pressure sensing techniques will be described by reference to a pressure sensing system designated generally by numeral 10. It should be appreciated, however, that the pressure sensors described below may find application in a range of settings and systems, and that its use in the pressure sensing application discussed is but one such application. FIG. 1 illustrates a diagrammatical view of an exemplary pressure sensing system 10 that has a differential pressure sensor 12 for use in an industrial application. By way of example, industrial applications include but are not limited to pressure differential measurements in piping applications, oil drilling applications, vessels, and chemical manufacturing applications, to name but a few. The industrial applications also may include pipelines, pressure chambers, flow devices, or similar applications. The differential pressure sensor 12 is disposed in an industrial unit 14, such as a pressure chamber, a flow device, a pump line, or a mixing chamber, or similar applications as will be appreciated by those skilled in the art in view of the present discussion.

The industrial unit 14 includes a first region 16 and a second region 18 at pressures that may be same or different from one other. The two regions 16 and 18 are isolated from one another by a barrier 20. The sensor 12 measures the pressure differential between the two regions 16 and 18. The sensor 12 is believed to be capable of measuring low differential pressure in the range of about 0.1 pound square inch (psi) to about 15 psi and is believed to be robust enough to withstand high static pressures of about 1000 psi to about 5000 psi, if not beyond. By determining the net effect of pressure forces between the first and second regions (i.e. 16 and 18, respectively) on a component or a series of components of the pressure sensor 12, the sensor 12 determines the difference in pressure between the two regions 16 and 18. Indeed, the exemplary sensor 12, as discussed in more detail below, presents features that facilitate measurement of relatively low pressure differential (e.g. about +/−10 psi) as well as withstanding relatively high pressure environments (e.g. about +/−5000 psi). Moreover, sensor 12 presents features that facilitate sensing higher pressure differentials as well.

The system 10 includes other functional components associated with the pressure sensing components, such as control circuitry 22, sensing circuitry 24, and processing circuitry 26. The control circuitry 22 coupled to the sensor 12 is adapted to facilitate excitation of one or more resonating devices of the sensor 12 to oscillate each resonating device at its natural resonant frequency. The details of this excitation and the resultant oscillations are discussed further below. The sensing circuitry 24 detects deformations of a membrane layer by measuring the changes in the oscillations of resonating devices present in the sensor 12, as the changes in the oscillations of the resonating devices have been corresponded with the deformation of the membrane layer as would be appreciated by those of ordinary skill in the art. Output data from the sensing circuitry 24 is then processed by the processing circuitry 26 to generate a value indicative of the pressure differential measured by the sensor 12. The system 10 further includes communication circuitry 28, a database 30, and a remote monitoring center 32. The database 30 is configured to store information pertinent and beneficial to the system 10, such as information generated about pressure differential in the environment and predefined information about the sensor 12, for example. The database 30 also is configured to store information from the sensing circuitry 24 or the processing circuitry 26, as may be needed for a particular application or use. As discussed further below, the database 30 may be located locally or remotely, such as, for example, at the remote monitoring center 32.

In the exemplary embodiment, the communication circuitry 28 receives data signals 34 from the processing circuitry 26 and transmits the data signals to a remote location, such as the illustrated remote monitoring center 32. The communication circuitry 28 comprises hardware and/or software that enables the communication circuitry 28 to communicate the data signals 34 to the remote monitoring center 32. In various embodiments, the communication circuitry 28 is configured to communicate the data signals to the remote monitoring center 32 in accordance with a cellular protocol, a wireless protocol, a radio frequency protocol, and the like. Of course, those of ordinary skill in the art will appreciate that any type of communication protocols can be employed.

Figure 2:
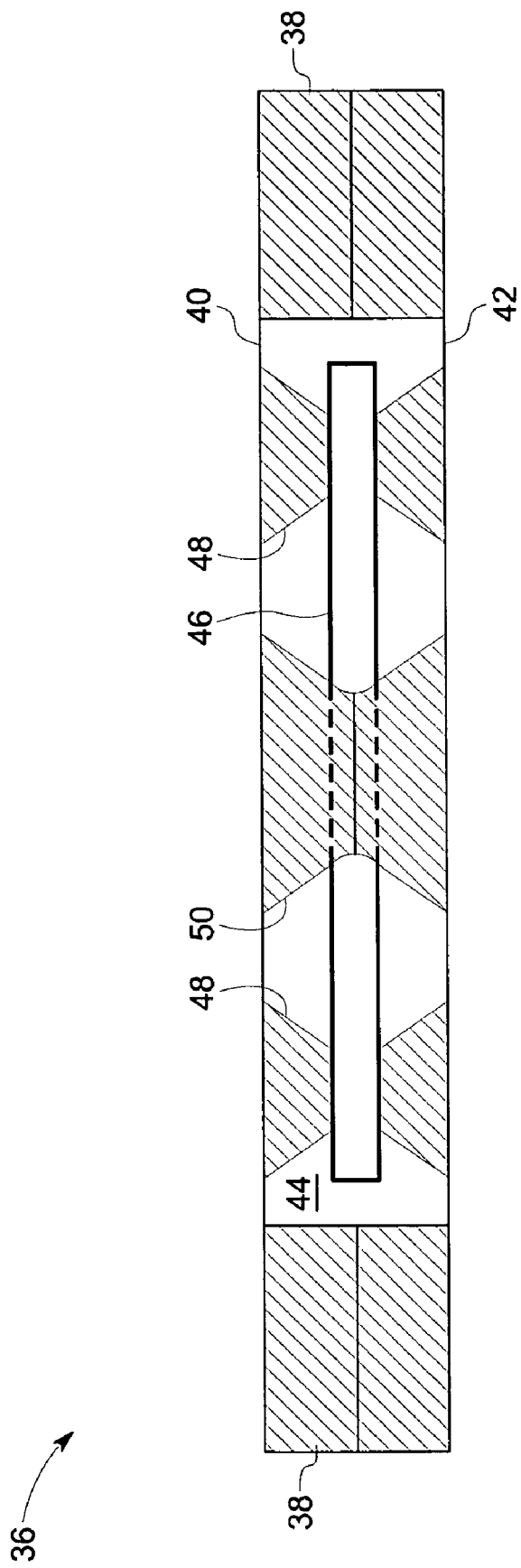
FIG. 2 is a cross-sectional view of a differential pressure sensor, in accordance with an exemplary embodiment of the present technique.

Referring now to FIG. 2, a cross-sectional view of one exemplary embodiment of a differential pressure sensor 36, for use in the pressure sensing system, such as system 10, is illustrated. The pressure sensor 36 includes a fixed support structure 38 for providing structural support to two membrane layers 40 and 42, which function as diaphragms. The fixed support structure 38 may be constructed as a circular structure, a rectangular structure, a square structure, or any closed or open structure that can facilitate pressure differential measurements between two pressurized environments. In this embodiment, the two diaphragms 40 and 42 are coupled to the fixed support structure 38 so that a cavity 44 is formed and defined by these structures. The cavity 44 may be evacuated to enclose a vacuum region inside.

A resonant member or a resonant beam 46 is disposed within the cavity 44. The resonant beam 46 may be excited via an electrostatic actuator embedded in the control circuitry 22, shown in FIG. 1. The resonant beam 46 is thus made to oscillate at its natural resonant frequency. However, when the resonant beam 46 is subjected to strain, such as the strain resulting from a deformation due to differential pressure, the resonant frequency of oscillation of the resonant beam shifts from the natural resonant frequency. This change or shift in the resonant frequency may be calibrated to read an amount of force, such as for example, pressure, weight, stress, and the like. The sensor 36 also includes a set of mesas 48 and 50. The resonant beam 46 is sandwiched between mesas 48 and may be symmetrically located along the centre of the sensor 36, while passing through mesa 50. Although, there are three sets of mesas shown in FIG. 2, any number of mesas may be constructed. As illustrated, central mesas 50 may be constructed to cover a larger area than the area covered by the peripheral mesas 48. The larger area of central mesas 50 transfers the force component acting perpendicularly to the membrane layer 40 to membrane layer 42, and vice-versa, thereby allowing a deformation of the resonant member 46 proportional to the difference in pressures acting on the two membrane layers. It will be appreciated by one of ordinary skill in the art that larger the area of the mesas, the lesser the losses due to line-pressure sensitivity of the membrane layers 40 and 42.

It is worth noting that within the cavity 44, mesas 48 may be asymmetrically placed between the fixed support structure 38 and mesa 50. The asymmetrical placement of mesas 48 may be based on the line-pressure sensitivity. This mesa asymmetry facilitates removal of line-pressure sensitivity of the two membrane layers 40 and 42.

Figure 3:
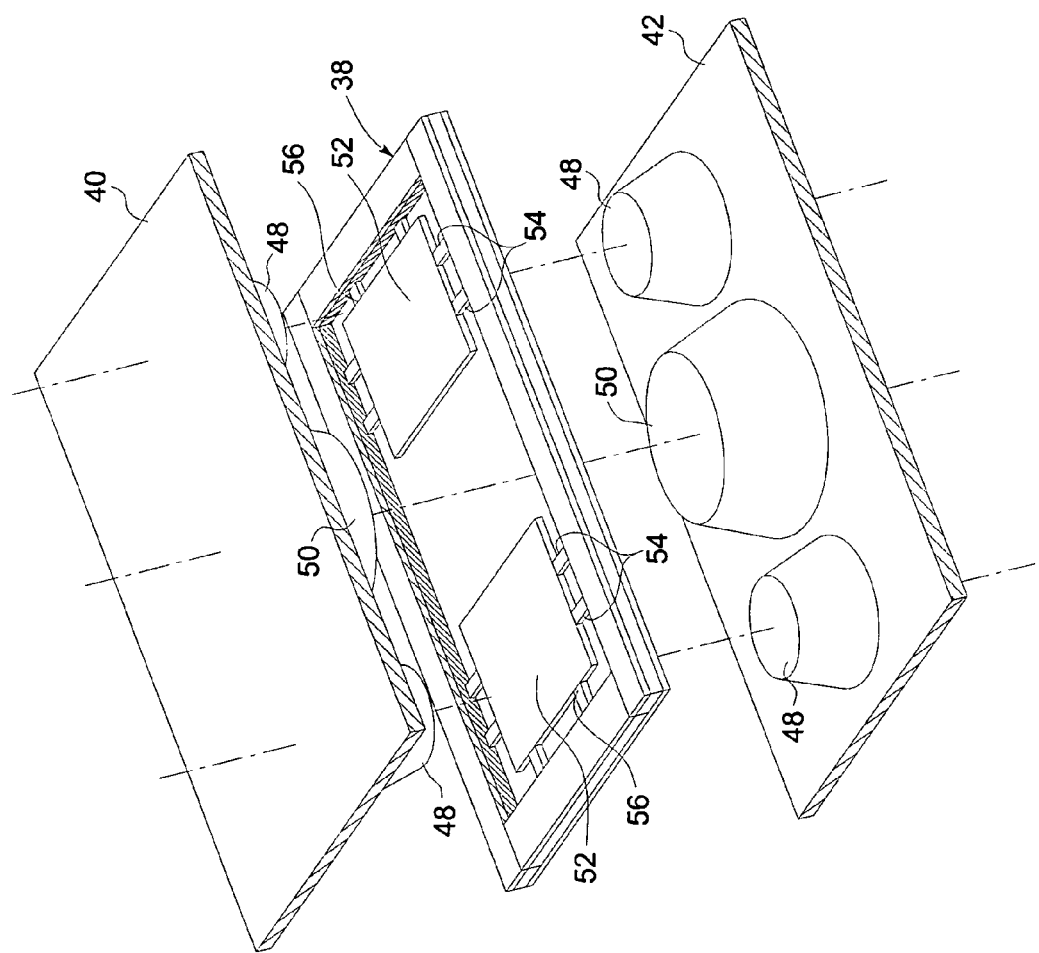
FIG. 3 is an exploded view of a differential pressure sensor, in accordance with an exemplary embodiment of the present technique.

Referring to FIG. 3, an exploded view of a differential pressure sensor 37 is illustrated. As shown, the pressure sensor 37 includes a fixed support structure 38, which supports two membrane layers or diaphragms 40 and 42. The diaphragms 40 and 42 and the fixed support structure 38 enclose vacuum pressure within the cavity formed therein. The cavity includes masses 52 that are coupled to the fixed support structure 38 by beam supports 54. Through the masses 52, one or more resonant members 56, such as resonant beams, are arranged. The diaphragms 40 and 42 and the masses 52 are be bonded together using mesas 48. As illustrated, the central mesa 50 is larger compared to the other mesas 48, and this mesa 50 is a single structure coupling the diaphragms 40 and 42. This structure facilitates transmission of the force acting due to pressure applied on diaphragm 40 to counter the force acting on diaphragm 42, or vice-versa. Thus, if $P_1$ is the pressure acting on diaphragm 40, and $P_2$ is the pressure acting on diaphragm 42, and if $P_1 > P_2$, the diaphragms 40 and 42 will move downwards in tandem, thereby causing masses 52 to move laterally in proportion to the difference in pressure, i.e., $P_1-P_2$. This lateral movement of masses 52 would result in the resonant members 56 being strained.

The resonant members 56 are energized via an electrostatic actuator embedded in the control circuitry 22, shown in FIG. 1. The resonant members 56 have a natural resonant frequency with which they oscillate when excited or energized. However, when the resonant members 56 are subjected to strain, the resonant frequency of oscillation of the resonant members shifts from the natural resonant frequency. This change or shift in the resonant frequency is calibrated to read an amount of force, such as for example, pressure, weight, stress, and the like.

FIG. 4 is a cross-sectional view of an alternative embodiment of a differential pressure sensor 58. The pressure sensor 58 includes a fixed support structure 38, disposed on which are two diaphragms or membrane layers 60 and 62. The diaphragms 60 and 62 are supported by and bonded to a large mesa structure 64. During fabrication, the fixed support 38 and the mesa structure 64 may include two layers of the fixed support and two layers of mesa structure that are then bonded to yield a single fixed support and a single mesa structure. A resonant beam or a resonant member 66 passes through a channel within the mesa 64. This resonant member 66 is constructed such that it is supported on either ends on two pillar-like smaller mesas 68.

The functioning of the sensor 58 is similar to the pressure sensor embodiments described above with reference to FIGS. 2 and 3. When a pressure of magnitude $P_1$ acts over the diaphragm 60, and a pressure of magnitude $P_2$ acts over the diaphragm 62, where $P_1 > P_2$ for example, the two diaphragms 60 and 62 will move downwards together along with the mesa structure 64. Mesa structure 68 facilitates the resonant member 66 to sway sideward, instead of directing the force due to the difference in pressures $P_1-P_2$ to cause the resonant member 66 to move downwards. Thus, high precision readings of the pressure differential $P_1-P_2$ may be acquired. It may be noted that if the central mesa structure 64 were not large enough, then there may be chances of local depressions in the diaphragms 60 and 62, because the line-pressures $P_1$ and $P_2$ may be very high of the order of thousands of psi in magnitude, and the cavity formed by the fixed support structure 38 and the diaphragms encloses vacuum pressure. Therefore, it will be appreciated by one of ordinary skill in the art that the central mesa 64 may be constructed to extend throughout the cavity formed by the fixed support structure 38 and the diaphragms 60 and 62 to reduce stresses. Thus, in one embodiment, mesa 64 may function as a single membrane layer with a channel therein that allows a resonant member to pass through. Such a structure will have a pancake-like structure that has a channel diametrically extending to the peripheral walls.

FIG. 5 is a cross-sectional view of an alternative embodiment of a differential pressure sensor 70 with a single membrane layer. As described earlier with reference to FIG. 4, the pressure sensor 70 also includes a fixed support structure 38, one diaphragm 72 that is formed by extending the central large mesa structure, and a resonant member 66 that rests on two smaller pillar-like mesa structures 68. During fabrication, the fixed support 38 and the diaphragm 72 (or extended mesa structure) may include two layers 74 and 76 that are bonded to yield a single fixed support 38 and a single mesa structure 72. The pressure sensor 70 functions in the same manner as the pressure sensor of FIG. 4. However, in sensor 70, the diaphragm or the membrane layer 72 has grooves 78 on surfaces of the diaphragms, as shown. These grooves 78 are similar to a corrugated pattern that allows the movement of the diaphragm 72 for facilitating higher differential pressure sensitivity. As previously described, mesas 68 may be asymmetrically positioned inside grooves 80, as illustrated. This asymmetric mesa placement reduces line-pressure sensitivity.

In sensor 70, the central mesa is extended towards the fixed support structure 38. Thus, sensor 70 has only a single pancake-like membrane layer 72 that includes a channel within, through which the resonant member 66 passes. Vacuum cavity 44 may also be present, in which the resonant member 66 can slide laterally.

It may be noted that fixed support structure 38, diaphragms 40, 42, 60, 62, and 72, mesas 48, 50, 64 and 68, masses 52, support beams 54, and resonant members 46, 56 and 66 may be fabricated using a semiconductor material, such as silicon (Si), silicon carbide (SiC), gallium nitride (GaN), and the like. Resonant members 46, 56 and 66 include one or more piezoresistive or piezo-capacitive elements that allow strain measurement. However, in other embodiments, metallic components or a combination of metallic and semiconductor components can be used too.

Although the embodiments illustrated and described hereinabove represent only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, the pressure sensor embodiments 12, 36, 58, and 70 may be employed in harsh environments, such as satellites, robots, avionic applications, and robots, among others. Furthermore, the sensor embodiments may be driven by circuitries known to those of ordinary skill in the art, which can actuate the resonant members, and correlate the deformation in the resonant members to pressure differentials.

Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A differential pressure sensor, comprising:
   a fixed support structure;
   a first membrane layer and a second membrane layer coupled to the fixed support structure wherein the first and second membrane layers cooperate to define at least one cavity therein;
   a resonant member disposed within the cavity and configured to oscillate at a resonant frequency; and
   one or more mesas bonded on the first and the second membrane layers and coupled to the resonant member, wherein the mesas are configured to transmit deformations generated in the first membrane layer to the second membrane layer and to the at least one resonant member.

2. The differential pressure sensor of claim 1, comprising at least one mesa coupling the first and second membrane layers through which the resonant member passes.

3. The differential pressure sensor of claim 1, wherein the first and second membrane layer comprises a semiconductor material.

4. The differential pressure sensor of claim 1, the cavity comprising vacuum pressure.

5. The differential pressure sensor of claim 1, wherein the resonant member is configured to be excited by an external voltage or current pulse via a control circuitry.

6. The differential pressure sensor of claim 1, wherein the resonant frequency of the resonant member changes based on the deformations generated in the first and the second membrane layers.

7. The differential pressure sensor of claim 1, wherein the deformations generated in the first and the second membrane layers produce a strain in the resonant member.

8. The differential pressure sensor of claim 1, wherein the one or more mesas are asymmetrically disposed within the cavity.

9. A method of manufacturing a differential pressure sensor, comprising:

disposing a first membrane layer including a first channel in a fixed support structure;

disposing a second membrane layer including a second channel in the fixed support structure, such that the first and second membranes form a membrane and the first and second channels form a closed channel, the closed channel extending to peripheral portions of the membrane; and disposing at least one resonant beam slidably within the closed channel and one or more cavities etched within the peripheral portions of the membrane, wherein the one or more pillars support the at least one resonant beam within the one or more cavities at the peripheral portions of the membrane.

* * * * *